United States Patent [19]
Cruciani

[11] Patent Number: 6,151,511
[45] Date of Patent: Nov. 21, 2000

[54] ADAPTER FOR INTEGRATED CIRCUIT CARDS FOR CELLULAR TELEPHONES

[76] Inventor: Andrea Cruciani, Via Lega Lombarda, 43, I-00162 Rome RM, Italy

[21] Appl. No.: 09/142,022
[22] PCT Filed: Mar. 3, 1997
[86] PCT No.: PCT/IT97/00043
   § 371 Date: Aug. 31, 1998
   § 102(e) Date: Aug. 31, 1998
[87] PCT Pub. No.: WO97/32280
   PCT Pub. Date: Sep. 4, 1997

[30] Foreign Application Priority Data

Mar. 1, 1996 [IT] Italy ............................ RM960041 U

[51] Int. Cl.⁷ .............................. G06K 7/00; H04M 1/00
[52] U.S. Cl. .......................... 455/558; 235/486; 361/737; 257/679; 439/76.1
[58] Field of Search ..................... 455/407, 558; 257/679; 235/492, 488, 486; 361/737, 764; 439/76.1, 638

[56] References Cited

U.S. PATENT DOCUMENTS

| | | | |
|---|---|---|---|
| 4,825,283 | 4/1989 | Shino | 257/679 |
| 5,336,877 | 8/1994 | Raab et al. | 235/475 |
| 5,353,328 | 10/1994 | Jokimies | 455/558 |
| 5,402,095 | 3/1995 | Janniere | 235/441 |
| 5,526,233 | 6/1996 | Hayakawa | 361/737 |

FOREIGN PATENT DOCUMENTS

| | | |
|---|---|---|
| 0 564 105 | 10/1993 | European Pat. Off. . |
| 2 634 095 | 1/1990 | France . |
| 44 19 073 | 12/1994 | Germany . |
| 44 07 173 | 9/1995 | Germany . |

Primary Examiner—Dwayne D. Bost
Assistant Examiner—Erika A. Gary
Attorney, Agent, or Firm—Finnegan, Henderson, Farabow, Garrett & Dunner, L.L.P.

[57] ABSTRACT

The adapter for cellular telephone apparatus arranged to operate with microprocessor subscriber identification cards having the plug-in format in cellular telephone apparatus arranged to operate with microprocessor subscriber identification cards having credit card format comprises a first area (4) for the insertion of the plug-in card (1) and a second area (5) for the connection of the adapter (3) with the cellular telephone apparatus, the first and second areas (4, 5) being spatially separated from each other and electrically connected, so that the signals coming from the first insertion area (4) are brought to the second connection area (5). Further embodiments are provided.

5 Claims, 5 Drawing Sheets

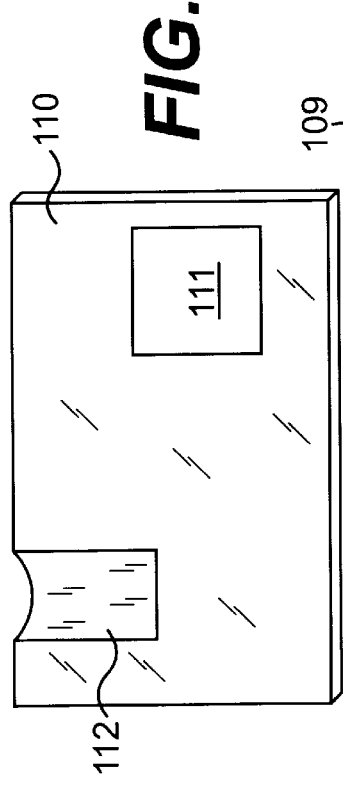
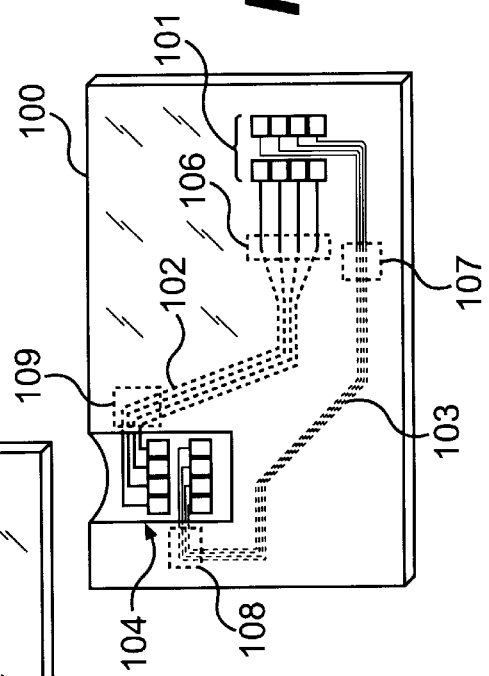
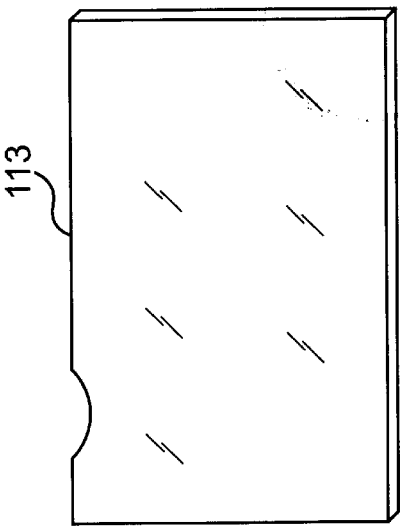

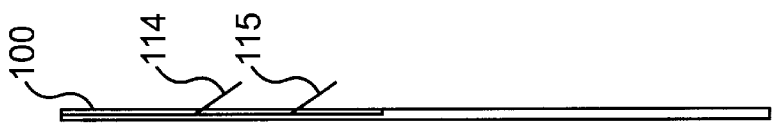
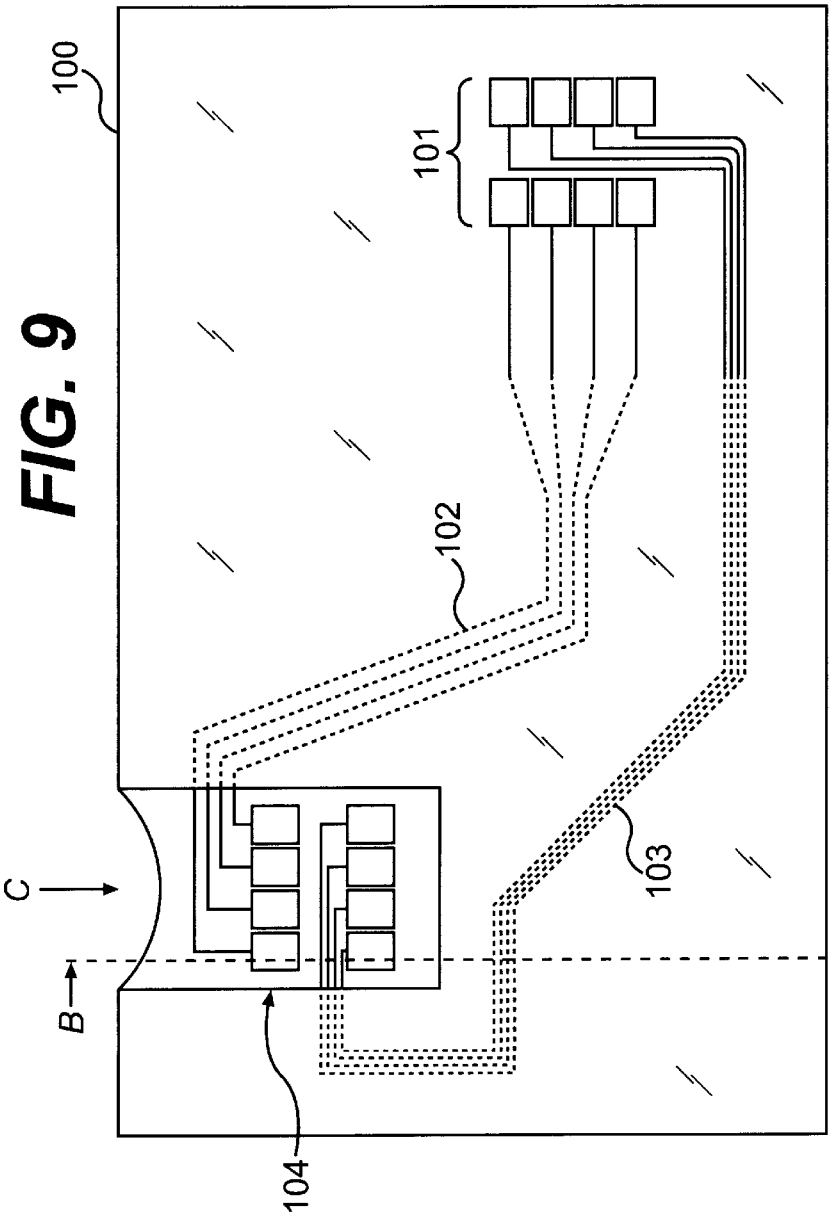
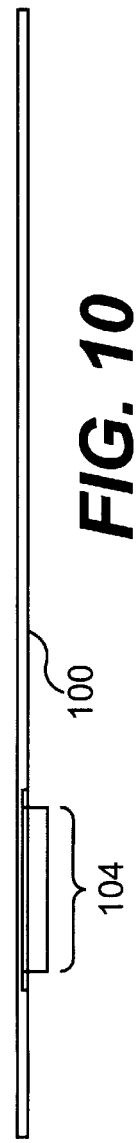

ADAPTER FOR INTEGRATED CIRCUIT CARDS FOR CELLULAR TELEPHONES

BACKGROUND OF THE INVENTION

The present invention relates to an adapter for integrated circuit cards for cellular telephones.

In cellular telephone apparatus, in particular of the "GSM" type, the information relating to the subscriber and to the situation of the subscription of the cellular telephone are stored into a "smart card" known with the name of "SIM" (Subscriber Identification Module) provided with a microprocessor, which will be identified hereinafter as subscriber identification card.

This subscriber identification card allows, once inserted in a cellular telephone different from the one normally used by the subscriber, to perform telephone calls with a charge on the account of the subscriber owner of the same, independently from the GSM cellular telephone which is utilized.

The card may have two different formats. The first format is according to the ISO standards and has the dimensions of a conventional "credit card"; the second format is appreciably smaller, about as large as a stamp, and is known with the colloquial denomination "plug-in card".

For a normal utilizer of a GSM cellular telephone frequently the problem occurs of transferring his own subscriber identification card having one of the two formats above referred to, into a telephone apparatus that allows the introduction of subscriber identification cards having the other of the two formats.

While the conversion from the credit card format into the plug-in format cannot be performed, on the contrary the converse can be carried out, i.e. the conversion from the plug-in format into the credit card format.

A conversion of this kind is performed by inserting the plug-in card or element into a suitable adapter, which is a plastic card having the format of a credit card and having a housing for the plug-in card or element.

According to the prior art, adapter are known which comprise a single layer carrier having a rectangular opening on the front side for receiving the plug-in element; said rectangular opening being closed on the lower side by means of a film. Following the insertion of the plug-in element it is quite possible that this latter may slip out of the adapter following a possible bending or flexing of the same or a sudden shock of the same.

According to a second embodiment of the prior art, the adapter comprises a lower layer and an upper layer, both having on the front side to be inserted into the cellular telephone apparatus a rectangular opening for receiving the plug-in card; there results however an unevenness of the thickness of the adapter in the connection area with the cellular telephone apparatus, subjecting the adapter and the plug-in card to dangers of wearout or damaging following the connection and disconnection operations.

In a further embodiment according to the prior art, the adapter comprises a single layer having a door for receiving the plug-in element; the door having two button elements for its closure after the insertion of said element. Also in this case, unexpected openings, damages and wearout in the connection and disconnection operations may occur.

A common disadvantage of such embodiments according to the prior art consists in the fact that there is provided an insertion area of the plug-in element in correspondence with the connection area of the adapter with the cellular telephone.

EP-A-0 564 105 discloses a memory module adapter comprising a circuit board having contacts, the size and configuration of which is compatible with a reader for a first memory module such as a credit card sized Subscriber Identity Module card. This adapter however has the inconvenience that the connector for the plug-in module has a thickness much greater than the thickness of the credit card, being therefore impossible its insertion into a telephone set that has a narrow slit, substantially corresponding in width to the actual thickness of the credit card sized Subscriber Identity Module card.

SUMMARY OF THE INVENTION

The aim of the present invention overcomes the problems deriving from the prior art above referred to, providing an adapter for the use in cellular telephone apparatus according to the characterizing clause of claim 1.

Accordingly, the bulging of the prior art due to the plug-in card is not created in the connection area of the adapter with the cellular telephone, owing to the fact that the plug-in card is inserted into an area spatially separated from the connection area.

Other embodiments of the present invention are outlined in the claims.

BRIEF DESCRIPTION OF THE DRAWINGS

The present invention will be now disclosed with reference to presently preferred embodiments to be considered only as a way of example and with reference to the attached drawings wherein:

FIGS. 6, 7, 8, 9, 10 and 11 show several views of the main parts of a second embodiment of the adapter according to the invention.

DETAILED DESCRIPTION OF THE DRAWINGS

Figure 1:
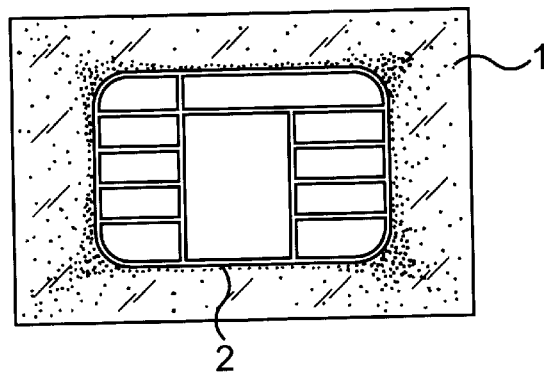
FIG. 1 shows a top plan view of a plug-in card.

With reference to FIG. 1, a top plan view of a plug-in card is shown, having a microprocessor generally indicated with 2 that contains information relating to the subscriber and the status of the subscription to the cellular phone.

Figure 2:
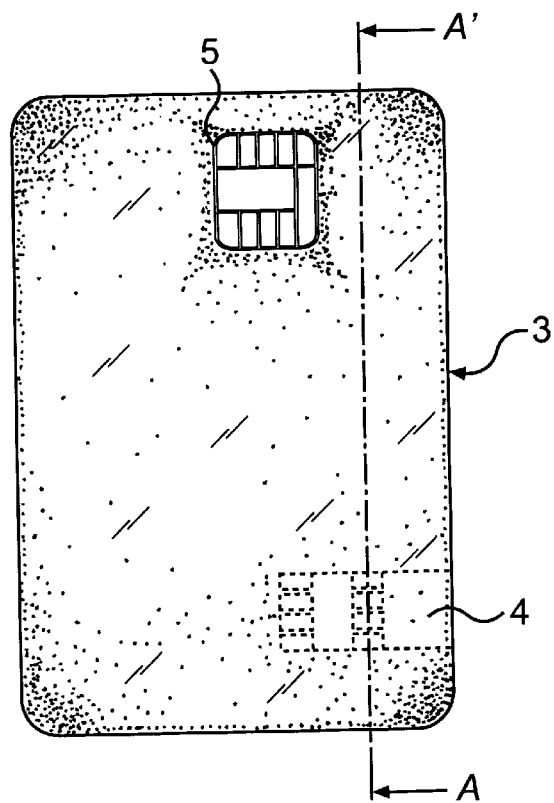
FIG. 2 shows a top plan view of a first embodiment of the adapter according to the invention.

In FIG. 2 there is shows a top plan view of the adapter 3 according to the present invention which comprises a first internal area 4, represented in the figure with a dotted line for the insertion of the plug-in card 1 and a second area 5 for the connection to the cellular telephone apparatus not shown.

Figure 3:
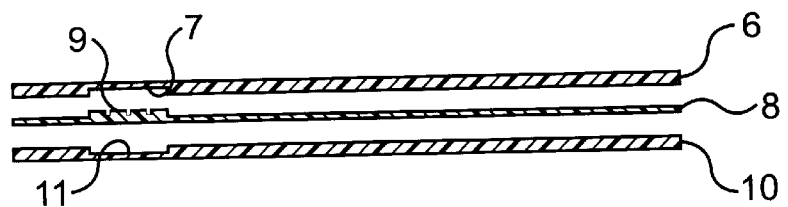
FIG. 3 shows an exploded sectional view of the adapter according to the invention taken along line A–A' of FIG. 2.

In FIG. 3 there is shown an exploded sectional view of the adapter 3 along the broken line A–A' of FIG. 2.

Figure 4:
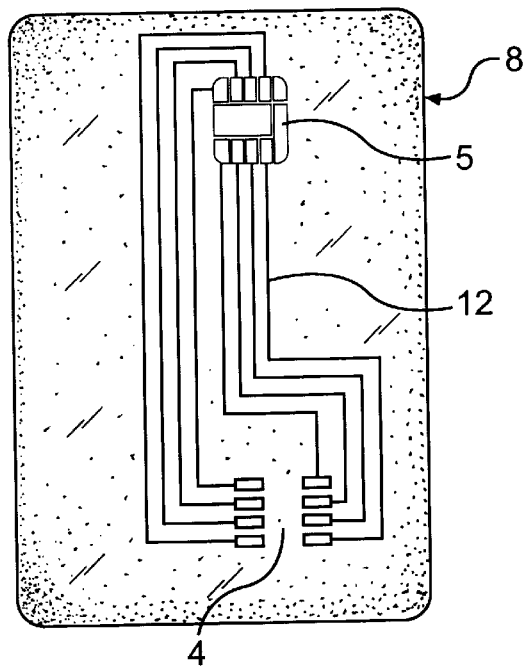
FIG. 4 shows a top plan view of the printed circuit utilized for realizing the adapter according to the invention.

In this FIG. 3 are shown:

an upper layer 6 at the interior of which there is realized a cavity 7 corresponding to the first internal area 4 for the insertion of the plug-in card 1;

an intermediate layer constituted of a printed circuit 8 shown more into detail in FIG. 4, at the interior of which there is provided a plurality of raised conductive elements 9 or "bumps" for the electrical contacts generally shown in 2, of the microprocessor (not shown) of the plug-in card 1 with the first internal area 4; and a lower layer 10 at the interior of which there is realised a cavity 11 corresponding to the first internal area 4 for the insertion of the plug-in card 1.

FIG. 4 shows a top plan view of the printed circuit 8 that constitutes the intermediate layer of the adapter 3 according to the present invention; in this figure the areas 4, 5 of insertion of the plug-in card 1 and of connection with the cellular telephone apparatus, respectively, are shown. Said areas are connected each other with a plurality of electrically conducting paths 12 suitable for carrying on the second area 5 of connection the signals coming from the microprocessor 2 of the plug-in card 1 placed on the first internal area 4 for its insertion.

Figure 5:
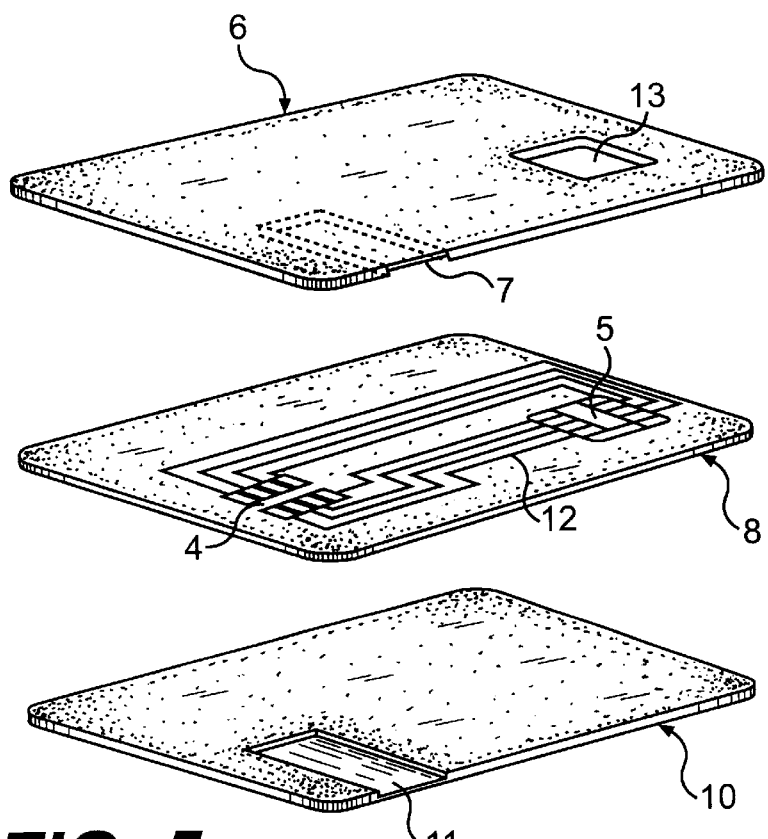
FIG. 5 shows an exploded perspective view of the adapter according to the invention.

FIG. 5 shows an exploded perspective view of the adapter 3 according to the invention.

The upper layer 6 has an opening 13 in register with the second area 5 for the connection of the adapter 3 with the cellular telephone.

With reference now to FIGS. 8–10, a second embodiment of the adapter will be disclosed.

The adapter comprises a main body 100 bearing a set of contacts 101 arranged for mating with the fixed contacts (not shown) existing on a cellular telephone.

The set of contacts 101 are interconnected by two sets of conducting paths 102, 103 with a corresponding set of contacts 104 arranged to engage elastically the contacts existing on the plug-in card 1 shown in FIG. 1.

For reasons of topology, as it is well known to person skilled in the art of printed circuits, in order to preserve the correct one-to-one correspondence between the contacts 101 and 104, the conducting paths 102, 103 interconnecting the sets of contacts 101, 104 for a first part lie on the same surface of the main body 100 carrying the contacts 101, 104 and in the areas 106, 107, 108 and 109, by means of plated through holes, are connected with conducting paths located on the under side of the main body 100. The use of plated through holes is a preferred embodiment, but a person skilled in the art of printed circuits may use other well known techniques.

The main body 100 is firmly fastened to a cover plate 110 having a window 111 for the contacts 101 and a flexible film or pouch 112 for holding the plug-in card 1 in register with the contacts 104.

The main body 100 is also fastened to a cover plate 113 for protecting the conducting paths 102, 103 located on the underside of the main body 100.

Preferably, the set of contacts 104 has to be realised either in elastic material or with an insert of elastic material in order to assure a conformal mating of the contacts of the plug-in card with the contacts of the adapter.

FIG. 9 shows an enlarged view of FIG. 7.

FIG. 11 shows a schematical section along line B—B of FIG. 9 where there may be seen the elastic contacts or elastically supported contacts 114, 115 making part of the set of contacts 104.

FIG. 10 shows schematically a lateral view looking in the direction of the arrow C of FIG. 9 for showing the general arrangement of the set of contacts 104.

Figure 14:
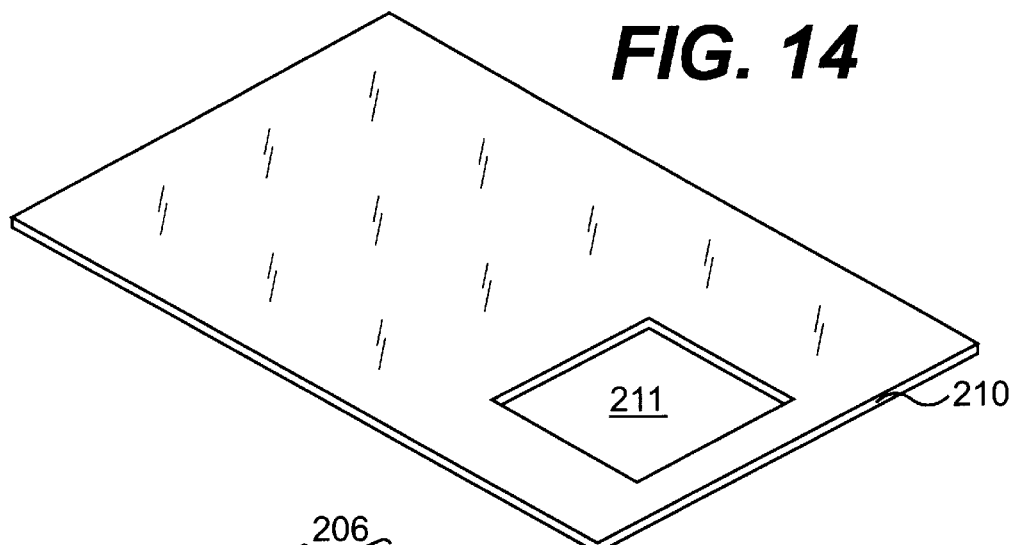
FIGS. 12, 13 and 14 show several views of the main parts of a third embodiment of the adapter according to the invention.
Figure 13:
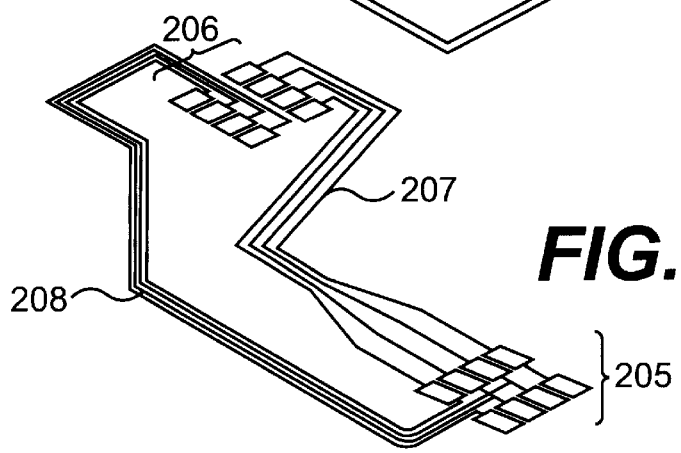
Figure 12:
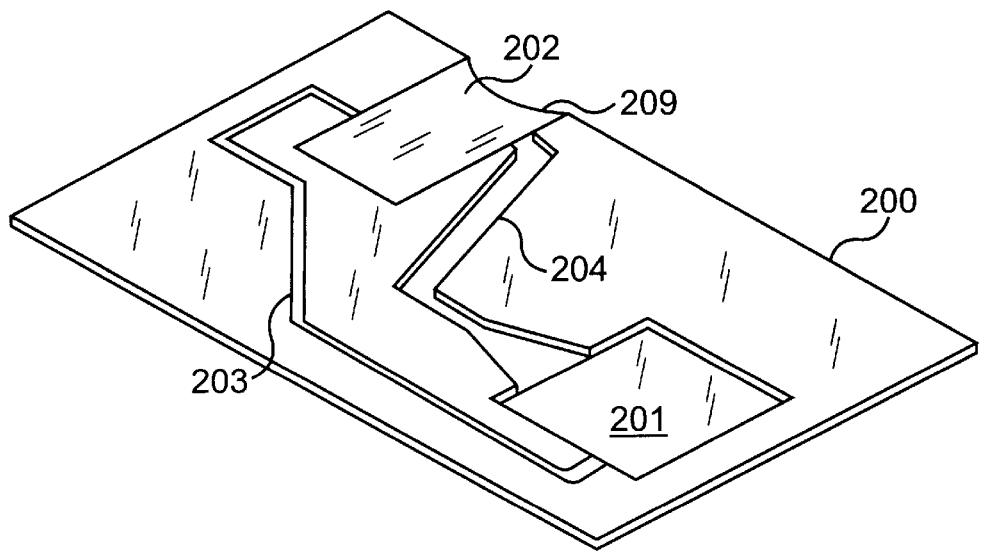

With reference now to FIGS. 12, 13 and 14, a third embodiment of the adapter according to the invention will be shown.

As it can be seen in FIG. 12, there is provided a main body 200 having a raised part 201 and a plurality of shaped cavities 202, 203 and 204 arranged for housing two sets of contacts 205, 206 interconnected in one-to-one relationship by means of conducting paths 207, 208. During the manufacturing step, the sets of elements 205-208 are realized on a disposable supporting layer not shown that is eliminated at the moment of the fastening of the elements 205–208 into the corresponding raised part 201 and cavities 202–204.

Also in this case the set of contacts 206 destined to mate with the contacts of the plug-in card 1 are realized with elastic material or in combination with an interposed elastic material in order to allow a conformal coupling with the plug-in card contacts. The plug-in card of FIG. 1, not shown in these figures is housed in a pouch realized with flexible film 209.

After the assembly of the parts shown in FIGS. 12 and 13 a sandwich structure is obtained by bonding a cover plate 210 having a window 211 for exposing the set of contacts 205.

It is to be noted that in all the embodiments that have been disclosed either one or both the external layers may be arranged to carry operating instruction and/or advertisement information.

The invention has been disclosed with reference to presently preferred embodiments, but it will be understood that several changes and/or modifications may be introduced by persons skilled in the art without departing from the scope of the invention as defined by the attached claims.

What is claimed is:

1. An adapter for the use of microprocessor based subscriber identification cards having the "plug-in" format (1) for cellular telephone apparatus in cellular telephone apparatus arranged to operate with microprocessor subscriber identification cards having the "credit card" format, in which a first area (4) for the insertion of the plug-in format subscriber identification card (1) and a second area (5) for the connection of the adapter (3) with the cellular telephone apparatus, the first and second areas (4, 5) being spatially separated each other and electrically connected, so that the signals coming from the first insertion area (4) are brought to the second connection area (5), and in which the first area (4) for the insertion of plug-in format subscriber identification card, the second area (5) for the connection of the adapter with the cellular telephone apparatus and the electrical connection (12) between the same, are realized by means of a printed circuit (8), characterized in that it comprises:

an upper layer (6) having a rectangular shape and having an opening (13) corresponding to the second area (5) for the connection of the adapter with the cellular telephone apparatus;

an intermediate layer constituted of the printed circuit (8); and a lower layer (10) having a rectangular shape, wherein internally to the respective upper and lower layers (6, 10) there are realized third and fourth cavity areas (7, 11) corresponding to the first area (4) for the insertion of the microprocessor subscriber identification card having a plug-in card 1 format.

2. An adapter according to claim 1 characterized in that the printed circuit has conducting paths (102, 103) interconnecting sets of contacts (101, 104) realized partially in the front and reverse side on a main body (100).

3. An adapter according to claim 2, characterized in that the passages of the conducting paths (102, 103) from the front and the reverse side and the converse of said main body (100) are realized by means of plated through holes.

4. An adapter according to claim 1, characterized in that a main body (200) is provided with a set of interconnected raised part (201) and cavities (202, 203, 204), being arranged for housing a set of contacts and conducting paths (205, 206, 207, 208); the main body (200) being arranged to cooperate with a cover layer having an opening (211) for the set of contacts (205), and being provided with a pouch (202) for housing the plug-in card (1) in register with the set of contacts (206).

5. An adapter according to any one of the preceding claims, characterized in that the contacts arranged to cooperate with the contacts of the plug-in card are realized in elastic material or are elastically mounted in order to obtain a conformal coupling between the contacts arranged to cooperate.

\* \* \* \* \*